United States Patent [19]

Ogawa et al.

[11] Patent Number: 4,892,591

[45] Date of Patent: Jan. 9, 1990

[54] FILLER FOR INK JET RECORDING PAPER

[75] Inventors: Masahide Ogawa; Teiji Sato, both of Shibata; Masao Takahashi, Shiunji; Kazumitsu Enomoto, Nakajo, all of Japan

[73] Assignee: Mizusawa Industrial Chemicals Ltd., Tokyo, Japan

[21] Appl. No.: 202,804

[22] Filed: Jun. 3, 1988

[30] Foreign Application Priority Data

Jun. 6, 1987 [JP] Japan .................. 140767

[51] Int. Cl.$^4$ .................. C04B 14/04
[52] U.S. Cl. .................. 106/482; 106/425; 106/426; 106/419; 106/461; 106/464; 106/465; 106/481
[58] Field of Search .......... 106/425, 426, 419, 461, 106/464, 465, 481, 482

[56] References Cited

U.S. PATENT DOCUMENTS

| | | | |
|---|---|---|---|
| 3,028,250 | 4/1962 | Dunn | 106/426 |
| 3,072,495 | 1/1963 | Pitrot | 106/426 |
| 3,849,149 | 11/1974 | Swift et al. | 106/465 |
| 4,207,377 | 6/1980 | Kindrick | 106/426 |
| 4,331,706 | 5/1982 | Kindrick | 106/425 |
| 4,463,108 | 6/1984 | Wagner et al. | 106/492 |

FOREIGN PATENT DOCUMENTS

| | | | |
|---|---|---|---|
| 2544218 | 4/1977 | Fed. Rep. of Germany | 106/425 |
| 629390 | 3/1962 | France | 106/296 |
| 292476 | 12/1987 | Japan . | |
| 1137543 | 12/1968 | United Kingdom | 106/426 |

*Primary Examiner*—Prince E. Willis
*Assistant Examiner*—Helene Klemanski
*Attorney, Agent, or Firm*—Spensley Horn Jubas & Lubitz

[57] ABSTRACT

Disclosed is a filler for ink jet recording paper, said filler being composed of amorphous silica particles having a median diameter, measured by the coulter counter method, of 2 to 15 μm, an oil absorption of at least 180 ml/100 g, a refractive index, measured by the solvent method, of at least 1.450, and a moisture absorption, measured when it is caused to absorb moisture for 200 hours at a relative humidity of 90% and a temperature of 25° C., of at least 35%, and a coating of a compound of a metal of Group II of the periodic table on the surface of the silica particles in an amount of 0.5 to 20% by weight.

10 Claims, No Drawings

FILLER FOR INK JET RECORDING PAPER

BACKGROUND OF THE INVENTION

1. Field of the Invention

This invention relates to a filler for ink jet recording paper. More specifically, it relates to an amorphous silica filler capable of giving recording paper on which ink jet printing can produce dots having excellent circularity and clear and vivid colors.

2. Description of the Prior Art

Ink jet recording has various advantages such as reduced noises, high-speed recording and the ease of multi-color printing, and has found use in various printers and facsimile devices. Ordinary high-quality paper or coated paper is difficult to use as recording sheets in this application because of its insufficient properties. Recording sheets used for this purpose should meet various requirements. For example, ink droplets adhering to a sheet surface should be absorbed rapidly within the sheet. Spreading or blurring of ink droplets on the sheet surface should be suppressed. Clear images having a significant density should be produced on the sheet surface, and these images should have excellent fastness characteristics.

It has been proposed to coat or include various inorganic solid substances, optionally together with binders, on a paper surface or within the paper in order to impart these characteristics to the surface of the paper substrate. For example, it has already been known to use synthetic silica and/or its salt (Japanese Laid-Open Patent Publication No. 157786/1982), apply a weak acid salt or an oxide for a divalent metal such as magnesium or zinc as a coated layer (Japanese Laid-Open Patent Publication No. 94491/1983), include natural zeolite, synthetic zeolite, diatomaceous earth, synthetic mica, etc., in a coated layer (Japanese Laid-Open Patent Publication No. 68292/1984), and use clay, talc, calcium carbonate, kaolin, acid terra abra, activated terra abra, etc. as a white pigment forming an ink absorbing layer (Japanese Laid-Open Patent Publications Nos. 89391/1983 and 95188/1984).

It is never sufficient, however, for fillers in ink jet recording sheets, to merely absorb ink. A certain fixed balance is required between absorption of the entire ink or adsorption of water or a solvent and adsorption of a dye. For example, when ink is absorbed rapidly in the filler layer, spreading or blurring of ink drops will be prevented. But since the dye also permeates through the filler layer, the resulting image tends to lack clearness or vividness and a proper density. It will be understood therefore that it is by no means easy in ink jet recording to satisfy simultaneously the requirement of preventing spreading or blurring of ink droplets and the requirement of increasing the density and clearness or vividness of images.

Ink for ink jet printing is generally a composition comprising a dye dissolved in a medium containing water and a small amount of an organic solvent. Fillers heretofore used are not fully satisfactory in respect of a balance of adsorption of various components in the ink. For example, if the adsorption speed of the dye is too high, the dot diameter decreases, and white spots occur in the solid portion. If the adsorption speed of the dye is too low, dot circularity cannot be obtained.

As an improvement over these items, we previously proposed the use of amorphous silica having a median diameter, measured by the coulter counter method, for 2 to 15 $\mu$m, an oil adsorption of at least 180 ml/100 g, a refractive index, measured by the solvent method, of at least 1,450, and a moisture absorption, measured when it is caused to absorb moisture for 200 hours at a relative humidity of 90% and a temperature of 25° C., of at least 35% as a filler for ink jet recording paper (Japanese Patent Application No. 136308/1986).

The amorphous silica filler proposed in this prior application simultaneously satisfied the requirement of preventing spreading of ink droplets and blurring and the requirement of increasing the density and clearness of an image in ink jet recording, but has been found to have a problem still to be solved. This problem is that a dye dot formed by ink jetting on recording paper using this filler has an excellent color density or vividness in the early stage, but is liable to fade or discolor under light with the lapse of time.

SUMMARY OF THE INVENTION

It is an object of this invention to provide a filler capable of giving ink jet recording paper in which dye dots formed by ink jetting have excellent circularity, color clearness or vividness and light fastness.

The present inventors have found that when the surface of the amorphous silica particles previously proposed as the filler for ink jet recording paper in the above-cited prior application is coated with a compound of a metal of Group II of the periodic table, the light fastness of the dye dot can be markedly increased while retaining the inherent advantages of the amorphous silica.

Thus, according to this invention, there is provided a filler for ink jet recording paper, said filler being composed of amorphous silica particles having a median diameter, measured by the coulter counter method, of 2 to 15 $\mu$m, an oil absorption of at least 180 ml/100 g, a refractive index, measured by the solvent method, of at least 1.450, and a moisture absorption, measured when it is caused to absorb moisture for 200 hours at a relative humidity of 90% and a temperature of 25° C., of at least 35%, and a coating of a compound of a metal of Group II of the periodic table on the surface of the silica particles in an amount of 0.5 to 20% by weight.

DETAILED DESCRIPTION OF THE PREFERRED EMBODIMENTS

The specific amorphous silica forming the substrate of the filler of this invention is superior in that it gives an image having a high density and excellent clearness or vividness and prevents spreading or blurring of ink dots, but suffers from the defect that the dye dots formed are liable to fade or discolor under light with the passage of time.

It has not yet been fully known why the dye held on the surface of the amorphous silica particles fades or discolors under light. Investigations of the present inventors, however, have shown that many acid sites exist on the surface of the amorphous silica particles, and some of these acid sites interact with the dye (the auxochrome of the dye) under irradiation of light (ultraviolet light), or in other words under light activating conditions, and consequently discoloration or fading occurs in the dye.

In contrast, it is presumed that when the surface of the specific amorphous silica particles is coated with a compound of a metal of Group II of the periodic table, those acid sites which have such an acid strength as to induce interaction with the dye under light irradiation conditions will be selectively neutralized or inactivated, and consequently the interaction of the acid sites with the dye activated by light will be prevented and the light fastness of the dye will be increased. This presumption well agrees with the experimental results given hereinafter which show that there is a nearly exact correspondence between the amount of acid having a specific acid strength and the fading of the dye.

In the present invention, it is basically important that the amorphous silica used as the substrate of the filler should have the aforesaid properties. First of all, this amorphous silica is markedly characterized by the fact that it has a very high refractive index of at least 1.450, especially 1.460 to 1.470, which is equal to, or higher than, the refractive index of quartz glass, and yet shows a high oil absorption of at least 180 ml/100 g and a moisture absorption, when caused to absorb moisture for 200 hours at a relative humidity of 90% and a temperature of 25° C. (unless otherwise specified, all moisture absorptions hereinafter are measured under these conditions), of at least 35%.

Wet-method silica and dry-method silica have previously been known as amorphous silica. The wet-method silica is obtained by neutralizing a sodium silicate solution with a mineral acid such as sulfuric acid, and the dry-method (gaseous phase-method) silica, by decompositing silicon tetrachloride in the gaseous phase. The wet-method silica has relatively high adsorption characteristics but mostly has a refractive index of less than 1.450. The gaseous phase-method silica has a relatively high oil absorption, but poor hydroscopicity as shown by its moisture absorption of less than about 10%.

The amorphous silica used in the present invention can be obtained by mixing an acidic sol of silica with basic aluminum sulfate to form a high-temperature-curable sol, hardening the sol to a gel, and subjecting the gel to steps including acid-treatment, ammonia treatment, washing the water and drying, and uniquely has a combination of a high refractive index, a high oil absorption and a high moisture absorption. Its production, however, is not limited to this method.

By using the amorphous silica defined by this invention as a substrate of a filler for ink jet recording paper, an image having a high density and high clearness or vividness can be obtained without blurring. The reason for this may be theorized as follows although the invention is in no way confined to this theory. Since the amorphous silica used in this invention has a high oil absorption, it has the excellent property of holding the ink applied as a jet on the surface of the particles or among the particles and consequently serves to prevent dot blurring or spreading effectively. In addition, since this amorphous silica shows a high moisture absorption under high-humidity conditions, it has the great action of drawing water into the inside of the particles from the ink layer held on the surface of the particles and thus a dense dye layer is formed on the surface of the amorphous silica particles. Furthermore, since the refractive index of the amorphous silica particles is high, multiple scattering or reflection occurs in the interface between the dye layer and the amorphous silica particles in the amorphous silica particles carrying the dye layer. Consequently, the density of the image increases, and the increased lightness or chroma leads to an improvement in clearness or vividness.

That the amorphous silica of the invention has an oil absorption of at least 180 ml/100 g, a moisture absorption of at least 35% and a refractive index of at least 1.453 is critical to the achievement of the object of this invention. This will be clearly seen from comparative examples given in Japanese Patent Application No. 136308/1986 cited above.

The amorphous silica substrate used in this invention has a median diameter, measured by the coulter counter method, of 2 to 15 μm. Its specific particle diameter differs depending upon the end use. Where paper smoothness or dot circularity is required, relatively small diameters within the above range are preferred. When it is desired to increase surface strength of paper and emphasize image clearness or vividness, relatively large diameters within the above range are preferred.

It is also important that the coating of the compound of a metal of Group II of the periodic table should be performed so that the amount of its coating is 0.5 to 20% by weight, especially 1 to 10% by weight, as oxide based on silica. If the amount of coating of the Group II metal compound is larger than the upper limit of the above range, the amorphous silica tends to lose its inherent characteristics, and therefore, the circularity or color vividness of the dye dot will be lost. If it is smaller than the lower limit of the specified range, the effect of improving light fastness is insufficient.

Method of producing amorphous silica

The amorphous silica used in the invention may be produced by mixing an acidic sol of silica with basic aluminumsulfate to form a high temperature-curable sol hardening the sol to a gel, and subjecting the gel to steps including acid-treatment, ammonia treatment, washing with water and drying.

The acidic sol of silica is a silica sol having a pH of not more than 3, especially not more than 2.5. In the present specification, the sol means a dispersion of colloidal particles in a medium, in which the colloidal particles are maintained flowable. This concept is in contrast to a gel in which colloidal particles are solidified while occluding the medium. The concentration of the silica sol as $SiO_2$ is 6.0 to 15.0% by weight, especially 9.0 to 13.0%. The acidic sol of silica can be obtained by filling an aqueous solution of a mineral acid such as sulfuric acid in a reaction vessel, adding sodium silica dropwise while the aqueous acid solution is stirred, and maintaining the pH of the mixture after the addition at 3 or less.

The basic aluminum sulfate used preferably has the chemical composition

wherein n is a number of 0.5 to 2.8, especially 0.9 to 1.5. The concentration of the basic aluminum sulfate as $Al_2O_3$ is advantageously 6.0 to 13.0% by weight, especially 8.0 to 11.0% by weight. The basic aluminum sulfate can be obtained by partially neutralizing aluminum sulfate with calcium carbonate to the above basicity.

The acidic sol of silica and the basic aluminum sulfate solution are mixed at the lowest possible temperature, particularly not more than 20° C., to prepare a heat-curable sol. The mixing ratio of the acidic silica sol and the basic aluminum sulfate solution, in terms of the mole ratio of $SiO_2$ to $Al_2O_3$, is desirably from 168:1 to 4:1, especially from 40:1 to 7:1.

The sol is heated to produce a hydrogel of silica. Desirably, the heating temperature is generally in the range of 60° to 100° C., especially 80° to 90° C. Desirably, heating is carried out under such conditions that the gelled product is in the form of granules, or in other words, gellation is carried out while the gelled product is granulated. For this purpose, the heat-curable sol may be fed in the form of liquid droplets into a heated water-immiscible medium whereby gellation proceeds to give gelled granules. Another method is to spray the heat-curable sol into a heated gaseous atmosphere to perform gellation and granulation.

The resulting gel is treated with an acid such as sulfuric acid to extract and remove the aluminum component from the gel. The sulfuric acid component in the gel is neutralized with ammonia or the like. The product is washed with water to remove salts as impurities. The product is dried and pulverized to obtain amorphous silica for use in this invention.

Properties of the amorphous silica

The amorphous silica used in this invention has an oil absorption (measured in accordance with JIS K-5101-19) of at least 180 ml/100 g, especially at least 200 ml/100 g. In view of its coatability on paper, the amorphous silica desirably should not have too high an oil absorption. If the oil absorption of the amorphous silica is excessively high, the viscosity of the coating slurry becomes too high and the amorphous silica is difficult to coat in a high concentration. Hence, the oil absorption of the silica is desirably not more than 250 ml/100 g.

The amorphous silica used in this invention has a refractive index of at least 1.450, mostly 1.460 to 1.470. As the amorphous silica, it exceptionally has a high refractive index.

The amorphous silica used in this invention has a specific surface area of generally 200 to 500 m$^2$/g, especially 280 to 450 m$^2$/g, and a pore volume, measured by the nitrogen adsorption method, of at least 1.20 cc/g, especially 1.30 to 1.8 cc/g.

It has been found that the amorphous silica obtained by the aforesaid method has a unique acid strength distribution. The amorphous silica is a kind of solid acid. The acid strength distribution of a solid acid can be determined by an n-butylamine titration method using Hammett's indicators. The relation between the acid strength function $H_O$ and the Hammet's indicator is shown as follows:

| $H_O$ | indicator |
| --- | --- |
| +1.5 | 4-benzeneazodiphenylamine |
| +3.3 | p-dimethylaminoazobenzene |
| +4.8 | Methyl Red |

If the reference to the above table, titration is carried out with 4-benzeneazodiphenylamine as an indicator, the amount of the solid acid having an acid strength function of up to +1.5 is measured. If titration is carried out using p-dimethylaminoazobenzene as the indicator, the cumulative amount of the solid acid having an acid strength function of up to +3.3 can be measured. By performing titration using various indicators, the acid strength distribution of the solid acid can be measured.

The amorphous silica used in this invention has an acid strength distribution such that the amount of the acid at an acid strength function $H_O$ of more than +1.5 and up to +3.3 is not more than 0.05 millimole/g, and the amount of the acid at an acid strength function $H_O$ of more than +3.3 and up to +4.8 is at least 0.20 millimole/g (Japanese Patent Application No. 136308/1986).

Coating treatment and coated particles

Examples of the Group II metal are zinc and alkaline earth metals such as calcium, magnesium, barium and strontium. These metallic components generally exist on the surface of the amorphous silica particles or silicate.

Various methods are used to apply the above metal component to the surface of the amorphous silica particles. For example, an aqueous slurry of the amorphous silica is prepared, and an aqueous solution or slurry of a hydroxide of the Group II metal, such as lime milk, is added to the aqueous slurry of the silica whereby the hydroxide is deposited on, and reacted with, the surface of the amorphous silica. The aqueous slurry of the amorphous silica desirably has a concentration of 5 to 25%. To deposit and react the hydroxide on or with the surface of the silica particles, it is generally preferred to stir the slurry at a temperature of 10° to 95° C. for 1 to 5 hours. The reaction product is filtered, washed with water as required, and dried to give the desired coated particles. The coated particles obtained by this method are X-ray diffractometrically amorphous, and the diffraction peak of hydroxide is extinct. It is seen from this fact that the Group II metal exists as a coating of amorphous metal silicate.

As an alternative method, the coated particles may be produced by adding an aqueous solution of a watersoluble salt, such as a chloride, nitrate or sulfate, of the Group II metal to the aqueous slurry of amorphous silica described above, adding an alkali hydroxide to effect neutralization and thus form a coating of the hydroxide the system, and thereafter performing reaction under the same conditions as above.

A change is observed in the acid strength distribution of the filler as a result of the coating treatment in the filler as a result of the coating treatment in accordance with this invention. As has already been pointed out, the amount of acid having an acid strength function $H_O$ for more than +1.5 and up to +3.3 is not more than 0.05 millimole/g in the amorphous silica, whereas it is not more than 0.020 millimole/g, especially not more than 0.010 millimole/g, in the coated particles of this invention. Accordingly, excellent light fastness can be obtained as a result of the decrease of the number of acid sites in this acid strength region.

The coated particles of this invention as a 5% aqueous dispersion generally has a pH of 6 to 11, especially 7 to 10, although it differs depending upon the type of the Group II metal.

It should be understood that although the other properties of the coated particles show some changes from those of the original amorphous silica, the range of such changes is generally considerably small.

Ink jet recording paper

According to this invention, an ink jet recording element is prepared by providing a layer of the coated amorphous silica described above on the surface of a support such as paper, or including the coated amorphous silica into the substrate. To provide a coated layer of this filler on the surface of the substrate, an aqueous slurry containing 5 to 40% by weight, particularly 10 to 255 by weight, of the filler and as required, 1 to 15% by weight, especially 2 to 10% by weight, of a binder is prepared, and coated on the substrate so that the rate of the filler applied is 3 to 20 g/m², especially 5 to 15 g/m², followed by drying.

The binder used for this purpose is advantageously an aqueous binder. Examples include water-soluble binders such as carboxymethyl cellulose, ethyl cellulose, hydroxyethyl cellulose, starch, carboxymethyl starch, cyanoethylated starch, casein, gum arabic, tragacanth gum, dextrin, polyvinyl alcohol, vinyl ether/maleic acid copolymer, polyvinyl pyrrolidone and water-soluble acrylic resins; self-emulsifiable binders such as self-emulsifiable acrylic resins; and aqueous latex-type binders such as a styrene/butadiene copolymer latex.

To include the filler into the paper, it is incorporated in a paper-making slurry so that after sheet formation, the filler may be included in the paper fibers in a proportion of 1 to 20% by weight, especially 2 to 10% by weight, based on the weight of the fibers.

If desired, the coated amorphous silica may be used in combination with another filler known per se such as kaolin, ordinary silica and calcium carbonate in ink jet recording paper.

According to this invention, by coating amorphous silica having unique properties as a matrix with a compound of the Group II metal and using the coated amorphous silica particles as a filler for ink jet recording paper, the light fastness and preservability of images formed on the recording paper can be markedly enhanced while substantially retaining the inherent characteristics of the amorphous silica, namely its effect of giving a recorded image having a high density and high clearness or vividness without blurring or excessive spreading of ink dots.

EXAMPLE 1

This example illustrates a method of producing a filler for ink jet recording paper by coating the surface of silica hydrogel substrate with a compound of a metal of Group II of the periodic table and evaluation of a coated test paper.

Preparation of silica substrate

The silica substrate was prepared in accordance with Example 1 described in the specification of Japanese Laid-Open Patent Publication No. 292475/1987 cited hereinabove.

A cooled dilute solution (8.2 m³) of #3 sodium silicate was reacted with 2.8 m³ of a 40% by weight solution of sulfuric acid at 18° to 20° C. to give 11 m³ of an acid silica sol having a pH of 1.8 and a $SiO_2$ concentration of 11 g/100 ml.

The silica sol was mixed at room temperature with 1.34 m³ of a solution (10% by weight of $Al_2O_3$) of basic aluminum sulfate represented by the chemical formula $Al_2(SO_4)_{1.2}(OH)_{3.6}$ to obtain a mixed sol having a pH of 2.30. The mixed sol was fed in the form of liquid droplets into spindle oil heated to 85° C. through a nozzle, and after heating and gellation, spherical particles of silica hydrogel were obtained.

The silica hydrogel was washed with water, and after the pH was lowered to about 1.0 with sulfuric acid, treated at 80° C. for 30 hours. After washing with water, the pH was increased to 10 with aqueous ammonia, and the treatment was carried out at 80° C. for 3 hours.

The product was thoroughly washed with water, and the resulting hydrogel (sample A) was dried and pulverized to give 1.25 kg of a fine powder of silica.

The fine silica powder was fed into a gaseous current-type classifier to give fillers for ink jet recording paper having a median diameter, measured by the coulter counter method, of 3.5 μm (sample B-1), 8.0 μm (sample B-2), and 13.0 μm (sample B-3).

Coating treatment (1) Calcium treatment

Five hundred grams of each of samples B-1, B-2 and B-3 obtained as above was put in a 5-liter beaker to form a 15% slurry, and with stirring, lime milk was added in a predetermined amount (% by weight) as oxide based on the silica substrate. The mixture was then stirred and aged at 90° C. for 2 hours to perform coating treatment. The product was filtered, dried, pulverized by an atomizer, and classified by an air current-type classifier as above to obtain coated silica as a filler for ink jet recording paper.

(2) Zinc treatment

Similarly, 500 g of each sample B was put in a 5-liter beaker and using water, a 15% slurry of sample B-2 was prepared. With stirring, an aqueous solution of zinc chloride was added in a predetermined amount (% by weight) as oxide, based on the silica substrate. A solution of sodium hydride was then added so as to adjust the pH of the slurry to about 8. The mixture was stirred and aged at 90° C. for 2 hours. Then, the product was filtered, dried, pulverized by an atomizer and classified by an air current-type classifier to obtain coated silica as a filler for ink jet recording paper.

(3) Treatment with other metals

The same procedure as in (2) above was repeated except that barium chloride or magnesium chloride was used as the Group II metal compound and sodium hydroxide was used as a neutralizing agent.

The median diameter, oil absorption, refractive index, moisture absorption, pore volume and acid strength distribution of each of the resulting fillers and the color fading property of a recorded image on a sheet of paper coated with the filler were examined by the following methods. The results are shown in Table 1.

It is seen from Table 1 that as compared with the blank sample (sample B-1), the metal compound-coated silica fillers for this invention markedly increase the fading resistance of a dye image recorded on ink jet recording paper.

(Testing Methods)

(1) Median diameter

The median diameter was measured under the following conditions using a coulter counter (model TA-II made by Coulter Electronics Co., U.S.A.). About 0.5 g of the sample was taken into a 200 ml beaker, and about 150 ml of deionized water was added. The sample was dispersed for 60 to 90 seconds by ultrasonication (using ULTRASONIC CLEANER B-220).

Several drops of the dispersion were put in 150 ml of an electrolyte solution (ISOTON II) by using a squirt, and the mixture was subjected to the coulter counter, and the particle size distribution of the silica was measured. The following aperture tubes were used for the respective particle size ranges measured.

Aperture tube 50μ: particle size range 1–20μm
Aperture tube 100μ: particle size range 2–40μm The median diameter was determined by reading the 50% diameter in the cumulative particle size distribution chart.

(2) Oil absorption

The oil absorption was measured in accordance with the Method of Testing Pigment in JIS K-5101-19.

(3) Refractive index

Various organic solvents having known refractive indices were put in test tubes, and aligned in order to increasing refractive indices. The sample powder was added and the test tubes were fully shaken to disperse it. The refractive index of the organic solvent which was determined to have the highest transparency by observation with unaided eyes was defined as the refractive index of the sample powder.

The refractive indices of the organic solvents used are tabulated below.

| Organic solvent | Refractive index/°C. |
| --- | --- |
| Cyclohexane | 1.4268/20 |
| Ethylene glycol | 1.4274/20 |
| Ethylene chloride | 1.4443/20 |
| Formamide | 1.4453/22.7 |
| Chloroform | 1.4467/20 |
| Lacquer thinner for nitrocellulose | 1.4485/20 |
| Acetylacetone | 1.4518/18.5 |
| Ethylenediamine | 1.4540/26.1 |
| Cyclohexanol | 1.4606/37 |
| Carbon tetrachloride | 1.4631/15 |
| Liquid paraffin | 1.4753/20 |
| Linseed oil | 1.4806/20 |
| Toluene | 1.4969/20 |
| Xylene | 1.4999/15 |

(4) Moisture absorption

About 1.5 g of the sample was put in a weighing bottle, and dried at 150° C. for 3 hours and its weight was accurately measured. The sample was then put in a desiccator which had been adjusted to a relative humidity of 90%. The desiccator was left to stand in a constant-temperature vessel kept at 25° C.

The weight increase of the sample was measured at each of the measuring times, and the moisture absorption was calculated from the following equation.

$$\text{Moisture absorption (\%)} = \frac{\text{Weight increase of the sample (g)}}{\text{Weight of the sample (g)}} \times 100$$

The measuring times were 24, 48, 72, 120, 192, 240, and 312 hours. The variations in moisture absorption for the respective times were plotted in graphs (see FIGS. 1 and 2). By an interpolation method, the moisture absorption corresponding to moisture absorption for 200 hours was determined.

(5) Pore volume

The pore volume was measured by using a surface area adsorption device in accordance with the BET method. This is based on the adsorption of nitrogen gas at the liquid nitrogen temperature ($-196°$ C.). Specifically, by using the amount of adsorption at a relative pressure P/PO of 1 in the adsorption isotherm, the total pore volume of pores having a pore diameter of not more than 300 Å was determined.

(6) Acid strength distribution

This was measured by an n-butylamine titration method.

About 0.5 g of the sample was put in a 50 ml Erlenmeyer flask having a ground stopper, dried at 150° C. for 3 hours, and accurately weighed. About 10 ml of a special grade benzene solution dehydrated by distillation was added, and the following Hammett's indicators were added dropwise to form acidic colors.

| Hammett's indicate | $H_O$ | Acidic color | Basic color |
| --- | --- | --- | --- |
| 4-benzeneazo-diphenylamine | +1.5 | orange | yellow |
| p-dimethylamino-azobenzene | +3.3 | deep orange | light yellow |
| Methyl Red | +4.8 | purple | light yellow |

For example, when p-dimethylaminoazobenzene (dimethyl yellow) is adsorbed on solid acid A, deep orange as an acidic color is formed. This is in accordance with the following reaction.

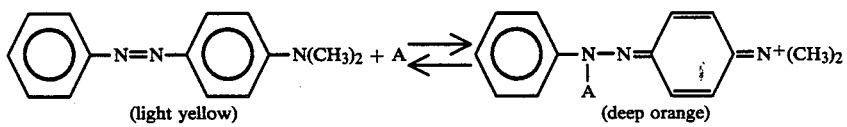

(light yellow)    (deep orange)

When n-butylamine is added, the acid site is neutralized to form a light yellow color which is a basic color.

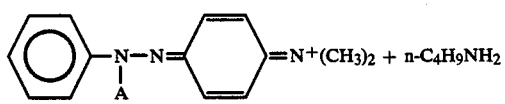

In the measurement, titration with N/20 n-butylamine was carried out over about 2 days, and from the amount of the n-butylamine required, the amount of the solid acid was calculated.

$$A = F \times V/20 \times W$$

where
A: the amount of the solid acid (mmoles/g)
F: the factor of N/20 n-butylamine
V: the amount titrated (ml)
W: the weight of the sample (g)

The end point of the titration was determined as follows on the basis of the colors in "Color Chips", edited by Japan Standards Association (in accordance with JIS Z-8721).

| $H_O$ | Color |
| --- | --- |
| +1.5 | 7.5 Y |
| +3.3 | 5 Y |

The acid strength distribution was determined by the following procedure.

When titration is carried out using 4-benzeneazodiphenylamine as an indicator, the amount of the acid having an acid strength function of up to +1.5 can be measured. When titration is carried out by using p-dimethylaminoazobenzene as an indicator, the amount of the acid having an acid strength function of up to +3.3 can be measured. Calculating the difference between the two acid amounts, the amount of the acid having an acid strength function $H_o$ of more than $+1.5$ and up to $+3.3$ can be obtained.

(7) Light fastness of a recorded image on paper coated with the filler (7-1) Method of preparing the coated paper To 10 g (after drying at 110° C.) of the filler was added 25 g of a 15% aqueous solution of polyvinyl alcohol (PVA 117, a product of Kuraray Inc.) as a binder. Water was further added to make the total amount 60 g. The mixture was fully stirred to form a coating dispersion. The coating dispersion was coated on a sheet of base paper (paper for PPC) having a basic weight of 45 g/m² at a rate of about 10 g/m² to obtain a recording paper.

(7-2) Method of ink jet recording

The coated paper obtained by the method of (7-1) was set on an ink jet color image printed (Model 10-0700 made by Sharp Corporation) connected to a small-sized computer (PC-9801 VMO made by Nihon Electrical Co., Ltd.), and a hard copy having the test pattern shown in FIG. 3 was obtained.

(7-3) Color fading test

The image surface of the test paper (hard copy) obtained by the method of (7-2) which was printed in four colors, black (IN-00110), magenta (IN-0012), cyan (IN-0013) and yellow (IN-0014) was irradiated for 14 hours with light from an ultraviolet lamp (253.7 nm; Model GL-15 made by Toshiba Electrical Co., Ltd.) with the distance between the test piece and the lamp being adjusted to 10 cm. The degree of color fading of the test piece was examined with unaided dyes, and evaluated on the following standards.

Evaluation

| | |
|---|---|
| ⊚ | Hardly any fading in comparison with the color before irradiation, and the vividness of the image was maintained. |
| ○ | Slight fading was seen in comparison with the color before irradiation, but the vividness of image was still maintained. |
| △ | Fading was seen in comparison with the color before irradiation, and the vividness of the image was lost. |
| X | Fading occurred to a very marked degree in comparison with the color before irradiation |

TABLE 1

| | Blank | Calcium oxide (CaO/Sample B) | | | | |
|---|---|---|---|---|---|---|
| | | 1% | 2.5% | 5% | 5% | 5% |
| Substrate (Sample B) | B-1 | B-1 | B-2 | B-1 | B-2 | B-3 |
| Water content | 3.7 | 2.9 | 4.2 | 3.5 | 3.6 | 3.1 |
| pH | 7.35 | 9.08 | 9.46 | 9.50 | 9.50 | 9.50 |
| Median diameter | 3.5 | 3.6 | 8.0 | 3.6 | 8.5 | 13.2 |
| Oil absorption (ml/100 g) | 236 | 2228 | 210 | 206 | 202 | 200 |
| Refractive index | 1.4631 | 1.4651 | 1.4695 | 1.4753 | 1.4753 | 1.4753 |
| Pore volume (ml/g) | 1.665 | 1.433 | 1.313 | 1.100 | 1.105 | 1.110 |
| Moisture absorption (%) | 49.1 | 47.7 | 44.0 | 43.1 | 42.0 | 40.5 |
| Acid strength (meq/g) $+1.5 < H_0 \leq +3.3$ | 0.022 | 0.012 | 0.008 | 0.002 | 0.002 | 0.002 |
| Color fading under light | | | | | | |
| black (IN-011) | △ | △ | ○ | ⊚ | ⊚ | ⊚ |
| magenta (IN-0012) | X | △ | ○ | ○ | ○ | ○ |
| cyan (IN-0013) | X | △ | ○ | ⊚ | ⊚ | ⊚ |
| yellow (IN-0014) | ○ | ○ | ⊚ | ⊚ | ⊚ | ⊚ |

| | Zinc oxide (ZnO/Sample B) | | Magnesium oxide (MgO/Sample B) | | Barium oxide (BaO/Sample B) |
|---|---|---|---|---|---|
| | 2.0% | 10% | 2% | 5% | 8% |
| Substrate (Sample B) | B-2 | B-2 | B-2 | B-2 | B-2 |
| Water content | 1.2 | 1.8 | 2.3 | 3.0 | 2.5 |
| pH | 7.83 | 8.00 | 7.70 | 8.35 | 8.40 |
| Median diameter | 8.2 | 8.5 | 8.2 | 8.2 | 8.3 |
| Oil absorption (ml/100 g) | 215 | 195 | 210 | 196 | 198 |
| Refractive index | 1.4695 | 1.4806 | 1.4695 | 1.4753 | 1.4806 |
| Pore volume (ml/g) | 1.330 | 1.022 | 1.300 | 1.110 | 1.010 |
| Moisture absorption (%) | 46.0 | 40.5 | 43.0 | 41.5 | 41.1 |
| Acid strength (meq/g) $+1.5 < H_0 \leq +3.3$ | 0.010 | 0.004 | 0.010 | 0.007 | 0.005 |
| Color fading under light | | | | | |
| black (IN-0011) | ○ | ⊚ | ○ | ⊚ | ⊚ |
| magenta (IN-0012) | ○ | ○ | ○ | ○ | ○ |
| cyan (IN-0013) | ○ | ⊚ | ○ | ○ | ○ |
| yellow (IN-0014) | ⊚ | ○ | ⊚ | ⊚ | ○ |

What is claimed is:

1. A filler for ink jet recording paper, said filler being composed of amorphous silica particles having a median diameter, measured by the coulter counter method, of 2 to 15 μm, an oil absorption of at least 180 ml/100 g, a refractive index, measured by the solvent method, of 1.460 to 1.500, and a moisture absorption, measured when it is caused to absorb moisture for 200 hours at a relative humidity of 90% and a temperature of 25° C., of at least 35%, and a coating of a compound of a metal of Group II of the periodic table on the surface of the silica particles in an amount of 0.5 to 20% by weight, wherein the coated silica particles has an acid amount, in an acid strength function $H_o$ of more than $+1.5$ and up to $+3.3$, of not more than 0.020 millimole/g.

2. The filler of claim 1 wherein the coated silica particles have a pH of 6 to 11 in its aqueous dispersion.

3. An ink jet recording element which comprises a paper substrate and a layer of a filler, said filler being composed of amorphous silica particles having a median diameter, measured by the coulter counter method, of 2 to 15 μm, an oil absorption of at least 180 ml/100g, a refractive index, measured by the solvent method, of at least 1.450, and a moisture absorption, measured when it is caused to absorb moisture for 200 hours at a relative humidity of 90% and a temperature of 25° C., of at least 35%, and a coating of a compound of a metal of Group II of the periodic table on the surface of the silica particles in an amount of 0.5 to 20% by weight, the filler being applied in a coated amount of 3 to 20 g/m².

4. An ink jet recording element according to claim 3, wherein the coated silica particles have a refractive index of 1.460 to 1.500.

5. An ink jet recording element according to claim 3, wherein the coated silica particles have an acid amount, in an acid strength function $H_o$ of more than $+1.5$ and up to $+3.3$, of not more than 0.020 millimole/g.

6. An ink jet recording element according to claim 3, wherein the coated silica particles have a pH of 6 to 11 in its aqueous dispersion.

7. An ink jet recording element which comprises a paper substrate and a filler included therein, said filler being composed of amorphous silica particles having a median diameter, measured by the coulter counter method, of 2 to 15 μm, an oil absorption of at least 180 ml/100g, a refractive index, measured by the solvent method, of at least 1.450, and a moisture absorption, measured when it is caused to absorb moisture for 200 hours at a relative humidity of 90% and a temperature of 25° C., of at least 35%, and a coating of a compound of a metal of Group II of the periodic table on the surface of the silica particles in an amount of 0.5 to 20% by weight, the filler being present in an amount of 3 to 20 g/m².

8. An ink jet recording element according to claim 7, wherein the coated silica particles have a refractive index of 1.460 to 1.500.

9. An ink jet recording element according to claim 7, wherein the coated silica particles have an acid amount, in an acid strength function $H_o$ of more than $+1.5$ and up to $+3.3$, of not more than 0.020 millimole/g.

10. An ink jet recording element according to claim 7, wherein the coated silica particles have a pH of 6 to 11 in its aqueous dispersion.

* * * * *